United States Patent
Beecher et al.

(10) Patent No.: US 9,579,690 B2
(45) Date of Patent: Feb. 28, 2017

(54) GENERATING PERCEPTIBLE TOUCH STIMULUS

(75) Inventors: Paul Beecher, Cambridge (GB); Chris Bower, Ely (GB); Piers Andrew, Cambridge (GB); Zoran Radivojevic, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/783,731

(22) Filed: May 20, 2010

(65) Prior Publication Data

US 2011/0286156 A1 Nov. 24, 2011

(51) Int. Cl.
*G06F 3/041* (2006.01)
*B06B 1/02* (2006.01)
*G06F 3/01* (2006.01)

(52) U.S. Cl.
CPC ............ *B06B 1/0292* (2013.01); *G06F 3/016* (2013.01)

(58) Field of Classification Search
CPC .... G06F 3/0488; G06F 3/04883; G06F 3/044; G06F 3/016; G06F 3/041; G06F 3/0412; G06F 2203/014; B06B 1/0292
USPC ................... 178/18.01–20.04; 345/173–178; 340/407.1; 361/679.01; 715/701, 702
See application file for complete search history.

(56) References Cited

U.S. PATENT DOCUMENTS

| 4,020,328 A * | 4/1977 | Bradam ............ 235/146 |
| 5,181,030 A | 1/1993 | Itaya et al. ............ 341/20 |
| 5,709,219 A | 1/1998 | Chen et al. ............ 128/782 |
| 5,869,791 A | 2/1999 | Young ............ 345/173 |
| 6,655,792 B2 * | 12/2003 | Benson et al. ............ 347/86 |
| 7,111,495 B2 | 9/2006 | Rapp et al. ............ 73/24.01 |
| 7,176,903 B2 * | 2/2007 | Katsuki et al. ............ 345/173 |
| 7,221,981 B2 | 5/2007 | Gliner ............ 607/1.16 |
| 7,385,443 B1 | 6/2008 | Denison ............ 330/9 |
| 8,626,283 B1 | 1/2014 | Zhou ............ 607/3 |
| 2002/0022873 A1 | 2/2002 | Erickson et al. ............ 607/1.17 |
| 2002/0149561 A1 | 10/2002 | Fukumoto et al. ............ 345/156 |
| 2004/0095330 A1 | 5/2004 | Ling et al. ............ 345/173 |
| 2004/0131998 A1 | 7/2004 | Marom et al. ............ 434/236 |
| 2004/0207542 A1 | 10/2004 | Chang et al. ............ 341/20 |
| 2005/0131490 A1 | 6/2005 | Palanker ............ 607/57 |
| 2005/0178454 A1 | 8/2005 | Parrish |
| 2005/0187454 A1 | 8/2005 | Gabl et al. ............ 600/372 |
| 2006/0061545 A1 | 3/2006 | Hughes et al. ............ 345/156 |

(Continued)

FOREIGN PATENT DOCUMENTS

CN 1343920 A 4/2002
CN 1546290 A 11/2004

(Continued)

OTHER PUBLICATIONS

"Polarity Effect in Electrovibration for Tactile Display", Kaczmarek et al, IEEE Trans. Biomed. Eng. Oct. 2006, (pp. 1-17).

(Continued)

*Primary Examiner* — Amr Awad
*Assistant Examiner* — Aaron Midkiff
(74) *Attorney, Agent, or Firm* — Harrington & Smith

(57) ABSTRACT

Apparatus including: a face including a first surface electrode and a second insulated surface electrode; and a controller configured to apply a time varying potential difference between the first surface electrode and the second insulated surface electrode and configured to control at least the time variation in the potential difference.

20 Claims, 3 Drawing Sheets

(56) References Cited

U.S. PATENT DOCUMENTS

Figure 1:
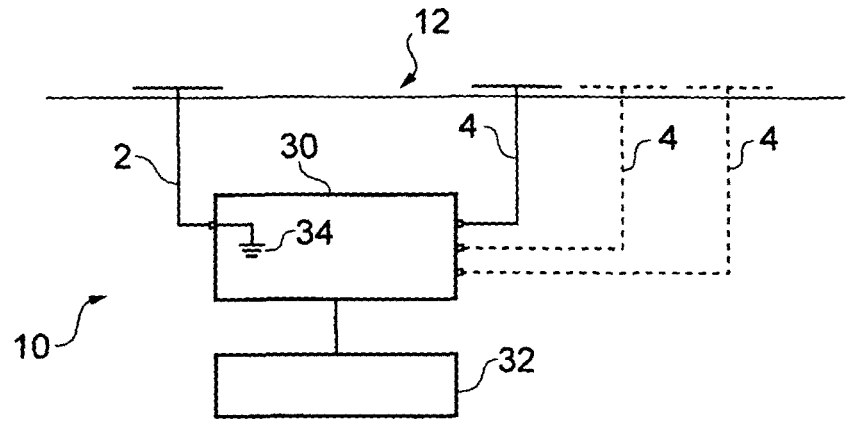

| | | | |
|---|---|---|---|
| 2006/0085049 A1 | 4/2006 | Cory et al. | 607/48 |
| 2006/0085056 A1 | 4/2006 | Schouenborg | 607/148 |
| 2006/0149341 A1 | 7/2006 | Palti | 607/48 |
| 2006/0241718 A1 | 10/2006 | Tyler et al. | 607/45 |
| 2008/0062144 A1* | 3/2008 | Shahoian et al. | 345/173 |
| 2008/0157893 A1* | 7/2008 | Krah | 331/177 R |
| 2008/0255434 A1 | 10/2008 | Hayter et al. | 600/309 |
| 2009/0002328 A1 | 1/2009 | Ullrich et al. | 345/173 |
| 2009/0079550 A1* | 3/2009 | Makinen et al. | 340/407.2 |
| 2009/0085878 A1 | 4/2009 | Heubel et al. | 345/173 |
| 2009/0128503 A1 | 5/2009 | Grant et al. | 345/173 |
| 2009/0167704 A1* | 7/2009 | Terlizzi et al. | 345/173 |
| 2009/0174671 A1* | 7/2009 | Tachi et al. | 345/173 |
| 2009/0243632 A1 | 10/2009 | Ozawa | 324/679 |
| 2009/0251421 A1 | 10/2009 | Bloebaum | |
| 2009/0293631 A1 | 12/2009 | Radivojevic et al. | 73/774 |
| 2009/0322496 A1 | 12/2009 | Da Costa | 340/407.2 |
| 2010/0079403 A1 | 4/2010 | Lynch et al. | 345/174 |
| 2010/0085169 A1 | 4/2010 | Poupyrev et al. | |
| 2010/0152794 A1 | 6/2010 | Radivojevic et al. | 607/2 |
| 2010/0231550 A1 | 9/2010 | Cruz-Hernandez et al. | 345/174 |
| 2010/0265210 A1* | 10/2010 | Nakanishi et al. | 345/174 |
| 2011/0032088 A1 | 2/2011 | Kim et al. | 340/407.1 |
| 2011/0037707 A1 | 2/2011 | Radivojevic et al. | 345/173 |
| 2011/0069026 A1 | 3/2011 | Chen et al. | 345/173 |
| 2011/0079449 A1 | 4/2011 | Radivojevic | 178/18.03 |
| 2011/0127880 A1 | 6/2011 | Murphy et al. | 310/317 |
| 2011/0279250 A1 | 11/2011 | Ryhanen et al. | 340/407.2 |
| 2011/0286156 A1 | 11/2011 | Beecher et al. | 361/679.01 |
| 2012/0038559 A1 | 2/2012 | Radivojevic et al. | 345/173 |
| 2012/0293441 A1 | 11/2012 | Eldering | 345/173 |

FOREIGN PATENT DOCUMENTS

| | | |
|---|---|---|
| CN | 101390789 A | 3/2009 |
| EP | 2000885 A1 | 12/2008 |
| JP | 2002-149312 A | 5/2002 |
| JP | 2004319255 A | 11/2004 |
| JP | 2005/276089 A | 10/2005 |
| JP | 2008/532564 A | 8/2008 |
| JP | 2008-269157 A | 11/2008 |
| TW | 483768 B | 4/2002 |
| TW | 573272 B | 1/2004 |
| TW | M375253 U1 | 3/2010 |
| WO | WO 87/07825 | 12/1987 |
| WO | WO 2006/041648 | 4/2006 |
| WO | WO 2007/010441 | 1/2007 |
| WO | WO 2008/037275 | 4/2008 |
| WO | WO 2009/037379 A1 | 3/2009 |
| WO | WO 2009/141502 A1 | 11/2009 |
| WO | WO 2009/158074 A1 | 12/2009 |
| WO | WO-2010/037894 A1 | 4/2010 |
| WO | WO 2010/066817 A2 | 6/2010 |
| WO | WO-2010/105001 A1 | 9/2010 |
| WO | WO 2010/0124683 | 11/2010 |

OTHER PUBLICATIONS

Yamamoto et al., "Electrostatic Tactile Display with Thin Film Slider and Its Application to Tactile Telepresentation Systems", IEEE Transactions on Visualization and Computer Graphics, vol. 12, No. 2, (Mar./Apr. 2006), (10 pages).

Peter B.L. Meijer, "Augmented Reality for the Totally Blind", Nov. 2010, (4 pages).

"Capacitively Coupled Electromagnetic Field Therapy as a Treatment Modality in Veterinary Medicine" http://www.scitechvet.com/articles.html, retrieved Dec. 30, 2008.

"Induced Current Constraints and Capacitive Effects in Inductive Nerve Stimulation"—McCarthy S, Haradem D, IEEE Transactions on Biomedical Engineering, vol. 37, Issue 6, Jun. 1990, pp. 598-605, http://ncbi.nlm.nih.gov/pubmed/2354841.

"Noninvasive Neuroelectronic Interfacing with Synaptically Connected Snail Neurons Immobilized on a Semiconductor Chip", Gunther Zeck, Peter Fromherz, PNAS Aug. 28, 2001 vol. 98 No. 18 10457-10462, http://www.pnas.org/content/98/18/10457.full.pdf+html.

"Capacitive Stimulatory Effect in Magnetic Stimulation of Nerve Tissue" Ueno S. Matsumoto S, Harada K, Oomura Y, IEEE Transactions on Magnetics, vol. 14, Issue5, Sep. 1978 pp. 958-960, http://ieeexplore.ieee.org/stamp/jsp?arnumber=01059800.

http://venturebeat.com/2008/05/30/startup-senseg-promises-game-changing-tactile-technology/—retrieved Jan. 12, 2009.

Karim Nice, Tracy V. Wilson and Gerald Gurevich; *How Digital Cameras Work*; Nov. 29, 2006. Howstuffworks.com.http://electronics.howstuffworks.com/cameras-photography/digital/digital-camera2.htm/printable Feb. 19, 2013.

Bao, Oliver, et al., *TESLATOUCH: Electrovibration for Touch Surfaces*, UIST'10, Oct. 4, 2010 (included as NPL in U.S. Appl. No. 13/092,564, filed May 21, 2010).

"Series E: Overall Network Operation, Telephone Service, Service Operation and Human Factors", ITU-T Recommendation E.161, Telecommunication Standardization Sector of ITU, Feb. 2001, 14 pgs.

http://www.nokia.com/about-nokia/research/demos/the-morph-concept; "Develop for Lumia", Feb. 25, 2014, 9 pgs.

Kaczmarek K A et al. *Electrotactile and Vibrotactile Displays for Sensory Substitution Systems* IEEE Transactions on Biomedical Engineering, IEEE Service Center, Piscataway, NJ, USA, vol. 38, No. 1, Dec. 31, 1991, pp. 1-16, ISSN: 0018-9294.

Kaczmarek K A et al. "*Electrotactile Haptic Display on the Fingertips: Preliminary Results*" Engineering in Medicine and Biology Society, 1994. Engineering Advance S: New Opportunities for Biomedical Enginers., Proceedins of the 16th H Annual International Conference of the IEEE Baltimore, MD, USA Nov. 3-6, 1994, New York NY, USA, IEEE, US, Nov. 3, 1994 (Nov. 3, 1994), pp. 940-941, XP010145716, DOI: 10.1109/IEMBS.1994.415223 ISBN: 978-0-7803-2050-5.

\* cited by examiner

GENERATING PERCEPTIBLE TOUCH STIMULUS

TECHNOLOGICAL FIELD

Embodiments of the present invention relate to haptics and the generation of perceptible touch stimulus.

BACKGROUND

Electromechanical actuators, such as vibrators, are currently used to create a touch stimulus. However, they have a number of drawbacks.

BRIEF SUMMARY

According to some but not necessarily all embodiments of the invention there is provided an apparatus comprising: a face comprising a first surface electrode and a second insulated surface electrode; and a controller configured to apply a time varying potential difference between the first surface electrode and the second insulated surface electrode and configured to control at least the time variation in the potential difference.

According to some but not necessarily all embodiments of the invention there is provided a module for an apparatus comprising: a face comprising a first surface electrode and a second insulated surface electrode; and an interface configured to receive a time varying potential difference and apply it between the first surface electrode and the second insulated surface electrode.

According to some but not necessarily all embodiments of the invention there is provided a method comprising: applying a time varying potential difference between a first surface electrode on a face of an apparatus and a second surface electrode on the face of the apparatus; and controlling at least the time variation in the potential difference.

BRIEF DESCRIPTION

Figure 2A:
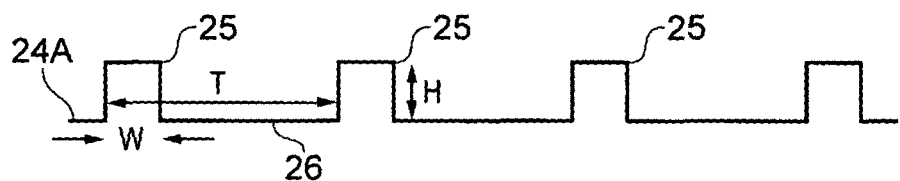
Figure 2B:
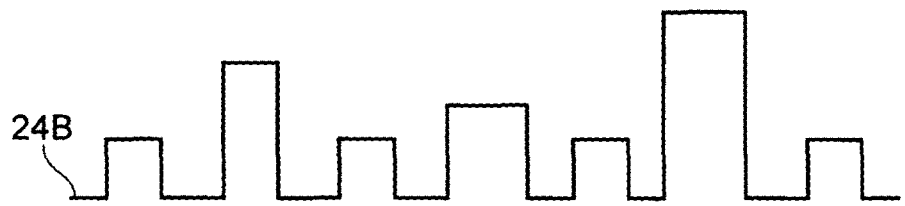
Figure 9:
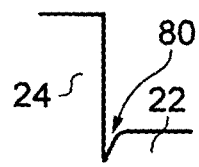
Figure 3:
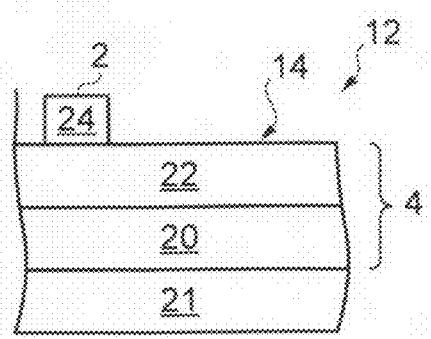
Figure 4A:
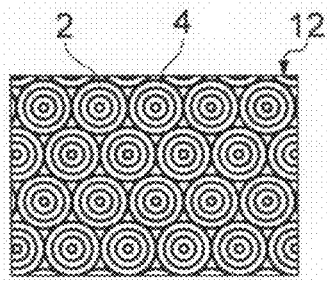
Figure 4B:
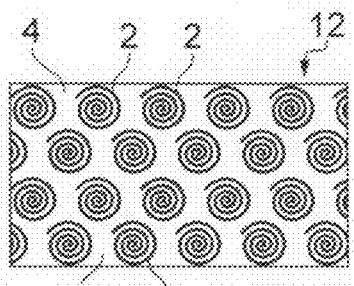
Figure 4C:
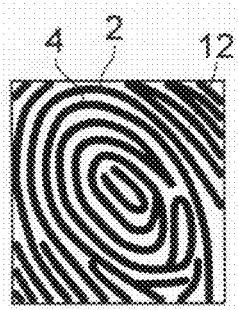
Figure 4D:
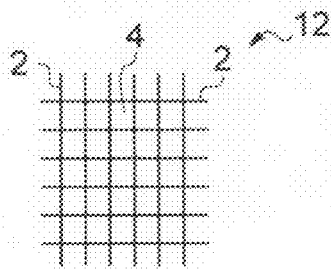
Figure 5:
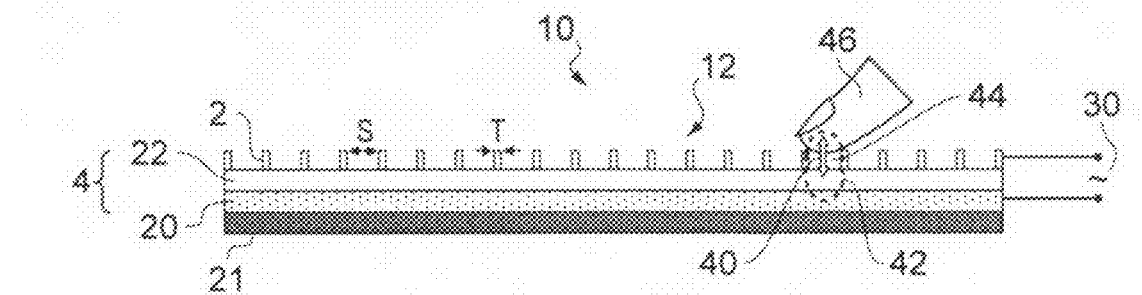
Figure 6:
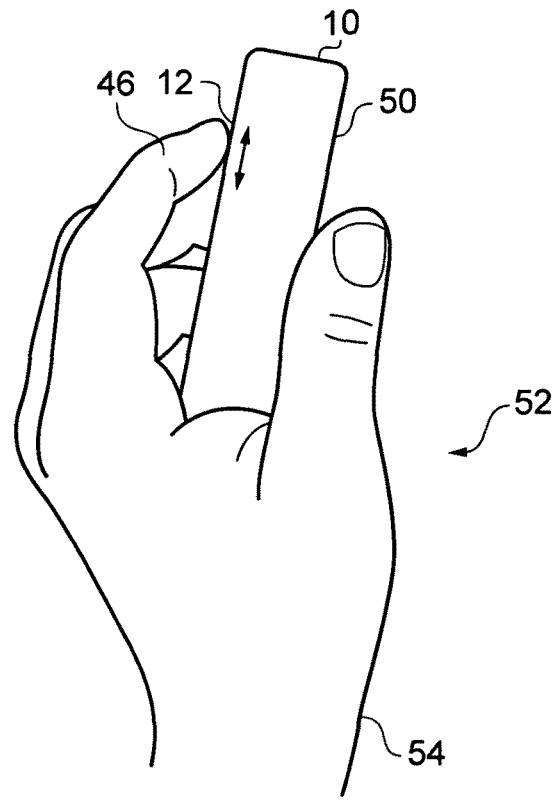
Figure 7:
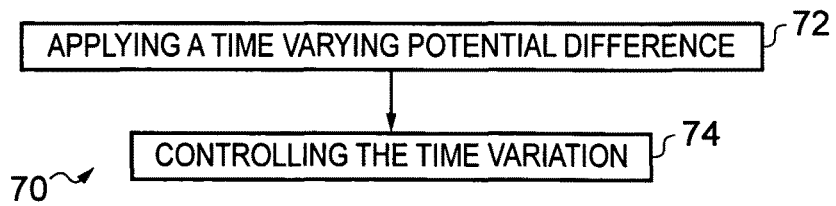
Figure 8:
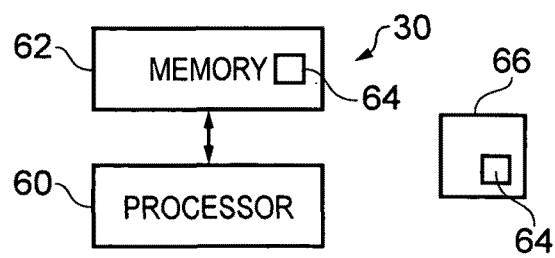

For a better understanding of various examples of embodiments of the present invention reference will now be made by way of example only to the accompanying drawings in which:

FIG. 1 schematically illustrates using functional components an example of an apparatus;

FIG. 2A schematically illustrates an example of a first applied periodic potential difference;

FIG. 2B schematically illustrates an example of a second applied periodic potential difference;

FIG. 3 schematically illustrates a cross-section through an example of an apparatus 10;

FIGS. 4A, 4B, 4C, 4D illustrate, in plan view, different layouts of tracks for the first surface electrode;

FIG. 5 schematically illustrates an example of an apparatus in cross-section;

FIG. 6 schematically illustrates use of an apparatus;

FIG. 7 schematically illustrates a method;

FIG. 8 schematically illustrates an example of one implementation of a controller for the apparatus; and FIG. 9 schematically illustrates a wicking channel

DETAILED DESCRIPTION

The Figures illustrate examples of an apparatus 10 comprising: a face comprising a first surface electrode 2 and a second insulated surface electrode 4 and a controller 30 (e.g. FIG. 1) configured to apply a time varying potential difference 24 (e.g. FIGS. 2A, 2B) between the first surface electrode 2 and the second insulated surface electrode 4 and configured to control at least the time variation in the potential difference 24.

A 'face' of an object may be comprised of an exterior bounding surface of the object that projects outward in substantially a single direction. The face may be continuous or may be comprised of multiple exterior bounding surfaces of the object that each projects outward in substantially the same direction. Thus if the face is logically divided into small planes, the normal vector to each plane would point in the same direction or substantially the same direction. In embodiments of the invention a single face comprises both the first surface electrode 2 and the second insulated surface electrode 4 and the electrodes form part of that single face.

In use, one portion of the user's digit contacts the first surface electrode 2 and another portion of the user's digit contacts or comes close to contacting the second insulated surface electrode 4. The two points of contact close a local electric circuit via the user's digit. The second insulated surface electrode 4 has an associated time varying electric field that varies with the applied time varying potential difference. The electric field produces a time-varying force that does not directly create a touch stimulus at the overlying digit of a user when the digit is stationary but does provide a touch stimulus indirectly when the digit of the user, while in contact with the first surface electrode 4, is traced over the face.

It is believed that the time varying force modulates the frictional force applied to the touching digit, which creates a modulating shear force at the surface of the digit when the digit is traced over the second surface electrode 4. The time varying touch stimulus perceived by the user as the digit is traced over the face creates a perceived 'texture' that can be modified by controlling at least the time variation of the applied potential difference.

In this document the term 'electrically modulated moving touch stimulus'(EMMTS) will denote a touch stimulus at a user's body part that is controlled using an apparatus to apply a time varying potential difference and that is perceptible to a user when there is relative motion between the body part and the apparatus while there is touch contact between the body part and the apparatus but is not perceptible to a user when there is not relative motion between the body part and the apparatus while there is touch contact between the body part and the apparatus.

The current that flows as a consequence of the applied time varying potential difference is typically less than 5 μA, which is less that the current required for direct activation of nerves or muscle.

EMMTS may therefore be viewed as electrically modulating (using the time varying potential difference) a nerve stimulation created by an alternative method (e.g. dragging a digit over the face).

FIG. 1 schematically illustrates an example of some functional components of an apparatus 10.

The apparatus 10 comprises, at a face 12, a first electrode 2, and one or more insulating electrodes 4. The apparatus 10 also comprises a controller 30 and an energy source 32. In this example the first surface electrode 2 is connected to a reference ground or earth 34.

The controller 30 is configured to apply a time varying potential difference between a (or each) second insulated surface electrode 4 and the grounding first surface electrode 2. The controller 30 is also configured to control at least the time variation in the potential difference. The system operates in a regime which is using 1-100 µA. When the controller 30 is applying a time varying potential difference to enable EMMTS the electric current flow via the surface electrode may be controlled so that it does not exceed 100 µA.

If the controller 30 is configured to apply a time varying potential difference to multiple second insulating second insulated surface electrodes 4 then it may be configured to provide a different time varying potential difference to each of the multiple second insulated surface electrodes 4. It may also be configured to individually and independently control at least the time variations in the different potential differences.

As the power consumption of the controller 30 is low when enabling EMMTS because of the very low electric current flow, it is possible to have EMMTS always enabled. The controller 30 is then configured to continuously apply a time varying potential difference between the second insulated surface electrode(s) 4 and the grounding first surface electrode 2 when the apparatus 10 is switched on or if desired even when the device is switch off.

FIGS. 2A and 2B schematically illustrates examples where the potential difference 24A, 24B is a series of top-hat pulses separated by periods T including gaps 26. Each pulse can be characterized by its height H and its width W. The train of pulse can be characterized by {H, W, T}.

The controller 30 may for example control the time variation in the potential difference by controlling one or more of H, W, T. The train of pulses can then be characterized by {H(t), W(t), T(t)}, where H(t) indicates time variation of the pulse height, W(t) indicates time variation of the pulse width and T(t) indicates time variation of the pulse period.

FIG. 2A schematically illustrates examples where the potential difference 24A is a series of regular top-hat pulses separated by regular fixed periods T including regular fixed gaps 26. Each pulse can be characterized by a fixed height H and a fixed width W. The train of pulse can be characterized by {H, W, T}, where H, W, T are constants.

FIG. 2B schematically illustrates examples where the potential difference 24B is a series of irregular top-hat pulses separated by irregular fixed periods T including irregular fixed gaps 26. Each pulse can be characterized by a time variable height H(t) and a time variable width W(t). The train of pulse can be characterized by {H(t), W(t), T(t)}, where one or more of H(t), W(t), T(t) vary in time.

In other implementations, the potential difference may be a sinusoid signal which is then characterized by {H(t),T(t)}.

In this example, the controller 30 has controlled the time variation in the potential difference by increasing the frequency of the periodic potential difference between FIGS. 2A and 2B and has introduced variations to the H, W, T that change over time.

It is believed that it is the change in electric field/frictional force generated by the potential difference that has most effect on user perception. Therefore, top-hat pulses as illustrated in FIGS. 2A and 2B may be preferred because of the rapid increase in potential difference creates an impulse modulation that is easily perceived using EMMTS. Furthermore, the time difference between the impulses creates a periodic surface 'texture' that is dependent upon the period T(t) and the speed of movement of a user's digit. The controller 30 by time modulating T(t) can therefore convey information to a user using EMMTS.

FIG. 3 schematically illustrates a cross-section though a face 12 of one example of the apparatus 10.

In this example, the second insulated surface electrode 4 overlies a substrate 21. The second insulated surface electrode 4 comprises a continuous conductive layer 20 that overlies a substrate 21 and a dielectric layer 22 that overlies the conductive layer 20. The dielectric layer 22 insulates the conductive layer 20 creating an 'insulated' surface electrode 4. Consequently, when a user touches an upper surface 14 of the second insulated surface electrode 4 there is no galvanic connection between the conductive layer 20 and the user.

The substrate 21 may be any arbitrary substrate that will support the conductive layer 20. In some embodiments it may be flexible in other embodiments it may be the body 11 of the apparatus 10. It may, for example, be a transparent and flexible polymeric film.

The conductive layer 20 may be formed from any suitable conducting material. It may, for example, be formed from metal such as aluminum (Al), copper (Cu), gold (Au), silver (Ag) etc. It may for example be a transparent conducting oxide such as indium-tin-oxide (ITO), fluorine doped tin oxide (FTO), aluminium doped zinc oxide (AZO). It may be a transparent metallic mesh utilizing thin wires of aluminum (Al), copper (Cu), gold (Au), silver (Ag) etc. where the wires are fine enough not to be seen, and the open aperture sufficient to give optical transparency. It may be formed from carbon nanotubes or graphene, or a transparent conducting polymer material such as polythiophene. In some embodiments, the material and thickness of the conductive layer may be chosen so that it is substantially optically transparent and a body of the apparatus 10, which acts as substrate 21, can be viewed through it. In other embodiments, the body may be metallic and provide the conductive layer 20 without a substrate 21.

The dielectric layer 22 may be a dielectric layer with preferably a high relative permittivity such as hafnium oxide ($HfO_2$), aluminum oxide ($Al_2O_3$) and titanium dioxide ($TiO_2$), barium or strontium titanate etc. Alternatively dielectrics with lower relative permittivity may be used. The dielectric layer may provide a hard, smooth surface.

The dielectric layer 22 may in some embodiments be optically transparent. It may be thin; for example, it may be 1 or 2 µm thick.

The combination of the first conductive layer 20, the dielectric layer 22 and the substrate 21 (if present) may be flexible.

The first surface electrode 2 is positioned on top of a portion of the dielectric layer 22. The first surface electrode 2 may be optically transparent. The first surface electrode 2 may be a galvanic surface electrode and is formed from an exposed conductive track 24 (no dielectric covering) so that when a user touches the first surface electrode 2 there is a galvanic connection between the conductive track 24 and the user.

The first surface electrode 2 may be formed from a network of electrically interconnected thin elongated conductive tracks. The first surface electrode 2 illustrated in FIG. 3 may be a cross-section through such an elongated track. The tracks are sized and positioned relative to each other at the face 12 such that a user digit placed on the face 12 will contact at least one track and will continue to contact at least one track as it is traced over the face 12. Examples of tracks are illustrated in FIGS. 4A to 4D and described below The interconnected parts of the first surface electrode 2 are sized and positioned relative to the second surface electrode 4 such that a local electric circuit between the electrodes is completed via a digit of a user that is traced across the face 12.

The second insulated surface electrode 4 needs to extend over the face 12 in at least one direction a distance that is sufficient to allow a digit of a user to be physically traced in that direction. The extension of the second insulated surface electrode 4 in that direction is sufficient, bearing in mind the rate at which the time varying potential varies in time, to allow a user to trace their digit over the second insulated surface electrode 4 at a reasonable rate and be able to feel the modulations. If periodic modulations are used, it may be necessary to have greater extension for lower frequency ranges. The extension is sized and the time variation of the potential difference is controlled to provide to a digit of a user that is traced across the second insulated surface electrode a time varying touch stimulus.

The second insulated surface electrode 4 may be a patch that is designed such that EMMTS can be achieved irrespective of the direction in which a digit contacting the patch is traced across the surface of the patch.

FIGS. 4A, 4B, 4C and 4D schematically illustrate, in plan view, a face 12 of different examples of the apparatus 10. In these Figs black ink represents thin elongate conductive tracks of the first surface electrode 2. The apparently separate tracks may be electrically interconnected or may be held at different potentials. They may be in a regular pattern with substantially constant width as in FIGS. 4A, 4B and 4C or in an irregular pattern as in FIG. 4C.

In the Figs the white background represents the second surface electrode 4 that is exposed where the first surface electrode 2 is not distributed. The distribution of the first surface electrode 2 is discontinuous in that the first surface electrode 2 extends over the face 12 but there are evenly distributed gaps in its coverage.

In these examples, the area presented for touch contact by the first surface electrode 2 is significantly less than the area presented by the second surface electrode 4. That is the gaps between the tracks of the first surface electrode 2 are significantly greater than the width of the tracks. For example, a separation distance between substantially parallel portions of one or more conductive tracks may be 30 times greater than the width of the conductive track(s). Consequently, the perimeter length of the first surface electrode 2 is significantly greater than a perimeter length of the underlying patch second surface electrode 4.

In some embodiments although the elongate conductive tracks of the first surface electrode 2 may be at the face 12 they may form relatively smooth and flat surface with the dielectric of the second insulated electrode 4. The apparently separate tracks may be electrically interconnected via insulated interconnects that pass through the substrate 21.

In other embodiments the elongate conductive tracks of the first surface electrode 2 may be on the face 12. They may form areas of higher relief compared to the dielectric 22 of the second insulated electrode 4. The apparently unconnected tracks may be electrically interconnected via surface interconnects or via insulated interconnects that pass through the substrate 21.

FIG. 5 schematically illustrates a cross-section through an example apparatus 10 in which elongated conductive tracks of the first surface electrode 2 are on the face 12.

The apparatus 10 comprises components as described with reference to FIGS. 1 and 3.

The first surface electrode 2 provides areas of relatively high relief at the face 12. The upper surface 14 of the second insulated electrode 4 provides a larger area of relatively low relief at the face 12.

The tracks forming the first surface electrode 2 have a width T and separation S. In a typical example, T may be in the region of 1-10 µm and S may be about 0.5-5 mm Therefore the areas of low relief are significantly greater than the areas of high relief.

The high relief tracks forming the first surface electrode 2 are in this particular example spaced to prevent a user digit touching the areas of low relief when the face 12 is touched by a digit 46. This results in an air gap 44 being formed between the digit and the surface 14 of the second insulated electrode 4. However, in other implementations the high relief tracks forming the first surface electrode 2 may be spaced to allow a user digit to touch the areas of low relief and high relief whenever the face 12 is touched by a digit 46.

Returning to the illustrated example, the conductive layer 20 of the second electrode 4 forms one plate of a capacitor in a closed local electric circuit 42 and the digit 46 via the first electrode 2 forms the other plate of the capacitor. The dielectric of the capacitor is formed by the dielectric layer 22 of the second insulated electrode 4 and the air gap 44 (if any) and also the insulating layer of the skin. The electric field developed across the capacitor is controlled by the alternating voltage 40 produced by the controller 30.

Referring to FIG. 9, the areas of relatively low relief 22 may have capillary wicking channels 80 adjacent the areas of high relief 24. The V shaped channels promote capillary wicking of sebaceous or other liquid contaminants along the base of the first surface electrode tracks. The capillary spreading helps to reduce the visibility of contaminants and reduces the likelihood that contaminants will interfere with the EMMTS operation.

Although the wicking channel 80 has an acute base for enhanced capillary action, this shape is not essential, and the effect will be seen even if the raised region 24 meets the surface region 22 at a 90 degree angle.

The periodicity of the tracks of the first surface electrode 2 can be selected so that the periodicity of the applied voltage by the controller 30 can be selected to create a resonance effect. This resonance effect enhances EMMTS and may also shake-off surface contaminants.

FIG. 6 schematically illustrates use of one example apparatus 10. In this example, the apparatus 10 is a hand-portable electronic apparatus 50. The user 52 holds the apparatus 10 using a hand 54. When held, the finger 46 of the user's hand 54 contacts the first surface electrode 2 at the face 12 and contacts or nearly contacts the second insulated electrode 4 at the face 12. The user 52 is able to trace the tip of the finger 46 over the second insulated surface electrode 4 while it is in contact with the tracks of the first surface electrode 2. The controller 30 is simultaneously applying a time varying potential difference between the second insulated surface electrode 4 and the first surface electrode 2 which the user perceives as 'texture' via EMMTS.

The controller 30 by controlling the time variation in the potential difference. can convey information to a user. Referring back to FIGS. 2A and 2B, for example, a change in the periodicity of the pulses 25 changes the periodicity of the 'texture' perceived at a user's digit using EMMTS.

The 'texture' may be controlled by the controller 30 to indicate a status of the hand-portable electronic apparatus 50. The controller 30 may be programmed to provide different 'textures' in different circumstances.

For example, the controller 30 may provide a periodically varying potential difference that has a variable periodicity (frequency). The frequency may, for example, be varied between 1 and 100 Hz to give a qualitative indication of an event such as arrival of new message (5 Hz), missed call (20 Hz) and a proximity alert (100 Hz).

As another example, the controller 30 may provide a periodically varying potential difference that has a variable periodicity (frequency). The frequency may, for example, be varied between 1 and 1 kHz to give a quantitative indication. For example one event may be indicated at 3 Hz, a few events (2-4) may be indicated at 20 Hz, many events (5-20) may be indicated at 100 Hz and lots of events (>100) may be indicated at 500 Hz.

In this or other embodiments, the hand-portable electronic apparatus 50 may have a key pad and each key in the keypad have an individual second insulated surface electrode 4 that is individually controlled by the controller 30. Each key would therefore have a different texture which could be used to indicate its function. The different textures could be achieved by using a regularly periodic potential difference.

In another embodiment by using electrical modulation with a frequency of greater than 1 kHz, an audio output can be generated in addition to the EMMTS.

FIG. 7 schematically illustrates a method 70.

At block 72, the controller 30, applies a time varying potential difference between a second insulated surface electrode 4 at a face 12 of an apparatus 10 and another electrode 2 at the same face 12 of the apparatus 10.

At block 74, the controller 30 changes at least the time variation in the potential difference to convey information to a user. The change may be a change in some of the basic pulsed train signal parameter such as {H(t), W(t), T(t)}, where H(t) indicates time variation of the pulse height, W(t) indicates time variation of the pulse width and T(t) indicates time variation of the pulse period. The controller 30 may be implemented using instructions that enable hardware functionality, for example, by using executable computer program instructions in a general-purpose or special-purpose processor that may be stored on a computer readable storage medium (disk, memory etc) to be executed by such a processor.

FIG. 8 schematically illustrate an example of one implementation of a controller 30 for the apparatus 10. The controller 30 comprises a processor 60 and a memory 62. It also comprises a signal generator controlled by the processor 60 to apply different time varying potential differences across one or more second insulated surface electrodes 4 and the reference electrode 2.

The processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions that control the operation of the controller 30 when loaded into the processor 60. The computer program instructions 64 provide the logic and routines that enables the apparatus to perform the methods illustrated in FIG. 7. The processor 60 by reading the memory 62 is able to load and execute the computer program 64.

The computer program may arrive at the controller 30 via any suitable delivery mechanism 66. The delivery mechanism 66 may be, for example, a computer-readable storage medium, a computer program product, a memory device, a record medium such as an article of manufacture that tangibly embodies the computer program 64. The delivery mechanism may be a signal configured to reliably transfer the computer program 64.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The controller 30 may be provided as a module.

The combination of the first surface electrode 2 and the second insulated surface electrode 4 may be provided as a module for attachment to a substrate 21 such as a display of any apparatus 2. Alternatively, the combination of the first surface electrode 2, the second insulated surface electrode 4 and the substrate 21 may be provided as a module for attachment to an apparatus 10 e.g. for attachment to a display of an apparatus.

As used here 'module' refers to a unit or apparatus that excludes certain parts/components that would be added by an end manufacturer or a user.

The blocks illustrated in the FIG. 7 may represent steps in a method and/or sections of code in the computer program 64. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Although in some embodiments the first surface electrode 2 is a galvanic surface electrode and is formed from an exposed conductive track 24 (no dielectric covering), in other embodiments it is an insulated surface electrode and is formed from a conductive track 24 that is wholly or partially covered by dielectric so that when a user touches the first surface electrode 2 there is not a galvanic connection but a capacitive connection between the conductive track 24 and the user. The dielectric material may be thin (1-10 micron thick) and not necessary optically transparent. However the size/shape/placement of the electrode 2 plays a role (because of capacitive coupling channel to the user palm). So the solution is easier if the common electrode 2 has galvanic contact with the user.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a face comprising a first surface electrode and a second insulated surface electrode, wherein the face is configured to produce, via friction, a touch stimulus at a digit of a user that is perceptible to the user when the digit of the user is traced across the face while the digit is in contact with at least a first portion of the face, and wherein the first surface electrode and the second insulated surface electrode are configured such that a local electric circuit between the electrodes is completed via the digit of the user when the digit is traced across the face;
   at least one processor; and
   at least one memory including computer program code, where the at least one memory and the computer program code are configured, with the at least one processor, to cause the apparatus to at least:
   apply throughout a time period a controlled time varying potential difference between the first surface electrode and the second insulated surface electrode while the digit is in contact with the first portion of the face to produce at the digit of the user:
   a) while the digit of the user is traced across the first portion of the face for any first arbitrary portion of the time period during which the controlled time varying potential difference is applied, a time varying touch stimulus, via friction, that is perceptible to the user at the digit of the user for the first arbitrary portion of the time period, and
   b) while the digit, in contact with the first portion of the face, is stationary for the first arbitrary portion of the time period during which the controlled time varying potential difference is applied, no touch stimulus, including no time varying touch stimulus, at the digit of the user; and
   control at least the time variation in the potential difference between the first surface electrode and the second insulated surface electrode to modulate the time varying touch stimulus during the time period produced by the time varying potential difference, via friction, at the digit of the user while it is traced across the first portion of the face during the time period.

2. The apparatus as claimed in claim 1, wherein an area presented for touch contact by the first surface electrode is significantly less than an area presented by the second insulated surface electrode.

3. The apparatus as claimed in claim 1, wherein the first surface electrode is discontinuously distributed over the face exposing the second insulated surface electrode where the first surface electrode is not distributed.

4. The apparatus as claimed in claim 1, wherein the first surface electrode comprises a plurality of electrically interconnected parts and wherein the parts are sized and positioned at the face such that a user digit placed on the face will contact at least one part.

5. The apparatus as claimed in claim 1, wherein the first surface electrode and the second insulated surface electrode are sized and positioned to complete a local electric circuit via a digit of a user that is traced across the face.

6. The apparatus as claimed in claim 1, wherein the first surface electrode comprises a network of thin elongated conductive tracks.

7. The apparatus as claimed in claim 6, wherein the conductive tracks have a substantially constant width.

8. The apparatus as claimed in claim 7, wherein a separation distance between substantially parallel portions of one or more conductive tracks is at least 30 times greater than the width of the one or more conductive tracks.

9. The apparatus as claimed in claim 1, wherein the first surface electrode comprises a pattern of thin elongated conductive tracks.

10. The apparatus as claimed in claim 1, wherein the first surface electrode is optically transparent.

11. The apparatus as claimed in claim 1, wherein the first surface electrode provides areas of relatively high relief at the face and wherein an insulating dielectric of the second insulated surface electrode provides areas of relatively low relief at the face.

12. The apparatus as claimed in claim 11, wherein the areas of relatively low relief have capillary wicking channels adjacent the areas of high relief.

13. The apparatus as claimed in claim 1, wherein the second insulated surface electrode comprises a continuous conductive layer and a dielectric layer.

14. The apparatus as claimed in claim 13, wherein the exterior of the second insulated surface electrode comprises a transparent exterior dielectric layer.

15. The apparatus as claimed in claim 1, wherein the at least one memory including the computer program code is configured with the at least one processor to cause the apparatus to provide, with the second insulated surface electrode, a time varying force to the digit of the user via a time varying electric field, associated with a common electrostatic potential at the face that varies with the time varying potential difference, wherein the time varying force modulates a frictional force applied to the digit of the user, providing a modulated frictional shear force when the digit of the user is traced across the second insulated surface electrode.

16. The apparatus as claimed in claim 1, wherein the at least one memory including the computer program code is configured with the at least one processor to cause the apparatus to vary at least a periodicity of a periodic potential difference between the first surface electrode and the second surface electrode.

17. The apparatus as claimed in claim 1, wherein the applied time varying potential difference is configured to electrically modulate a nerve stimulation created by tracing the digit across the face.

18. A method comprising:
   applying, throughout a time period, a controlled time varying potential difference between a first surface electrode and a second insulated surface electrode, comprised in a face, wherein the face is configured to produce, via friction, a touch stimulus at a digit of a user that is perceptible to the user when the digit of the user is traced across the face while the digit is in contact with at least a first portion of the face, and wherein the first surface electrode and the second insulated surface electrode are configured such that a local electric circuit between the electrodes is completed via the digit of the user when the digit is traced across the face, wherein the controlled time varying potential difference between the first surface electrode and the second insulated surface electrode is applied throughout the time period while the digit is in contact with the first portion of the face to produce, at the digit of the user:
a) while the digit of the user is traced across the first portion of the face for any first arbitrary portion of the time period during which the controlled time varying potential difference is applied, a time varying touch stimulus, via friction, that is perceptible to the user at the digit of the user for the first arbitrary portion of the time period, and
b) while the digit, in contact with the first portion of the face, is stationary for the first arbitrary portion of the time period during which the controlled time varying potential difference is applied, no touch stimulus, including no time varying touch stimulus, at the digit of the user; and controlling at least the time variation in the potential difference between the first surface electrode and the second insulated surface electrode to modulate the time varying touch stimulus during the time period, produced by the time varying potential difference, via friction, at the digit of the user while it is traced across the first portion of the face during the time period.

19. The method as claimed in claim 18, comprising:
applying a periodic potential difference between the first surface electrode and the second insulated surface electrode and varying the periodicity of the periodic potential difference.

20. The method as claimed in claim 18, further comprising creating relative movement between the body of the second insulated surface electrode and the digit of the user that contacts the second insulated surface electrode.

\* \* \* \* \*